United States Patent [19]
Peak

[11] 3,868,878
[45] Mar. 4, 1975

[54] CUTTING DEVICE

[76] Inventor: Ben H. Peak, Holiday Hills Space 272, 2000 W. 92 Ct., Denver, Colo. 80221

[22] Filed: Oct. 9, 1973

[21] Appl. No.: 404,354

[52] U.S. Cl. .............................. 83/356.3, 83/403.1
[51] Int. Cl. ......................... B26d 5/20; B26d/1/28
[58] Field of Search .......................... 83/349, 356.3, 83/403.1, 355, 509

[56] References Cited
UNITED STATES PATENTS

| 758,637 | 5/1904 | Frenzel | 83/356.3 |
| 864,552 | 8/1907 | Perkins et al. | 83/356.3 |
| 3,217,988 | 11/1965 | Lightfoot et al. | 83/356.1 |
| 3,324,753 | 6/1967 | Lindau | 83/355 |
| 3,646,894 | 3/1972 | Hasten et al. | 83/355 X |

Primary Examiner—Willie G. Abercrombie
Attorney, Agent, or Firm—Burton, Crandell & Polumbus

[57] ABSTRACT

A cutting device is disclosed herein that is particularly useful to cut paper into strips suitable for use as bedding for an animal pen. A cutting element is utilized that has a rotatable portion with two oppositely disposed spiral blades and a fixed portion with a knifelike straight edge that is positioneed contiguous to the path of the blades of the rotatable portion. The rotatable portion of the cutting element is driven by a motor at a fixed speed during normal operation of the device and a downwardly slanting feed table is provided across which paper is manually fed toward the cutting element. To establish the maximum thickness of paper that can be fed to the cutting element, a bar is positioned above and across the surface of the feed table so that paper to be cut passes between the bar and feed table prior to reaching the cutting area. A pair of vertically stacked feed rollers are positioned between the feed table and the cutting area and receive the paper from the feed table after the paper to be cut has passed under the bar across the feed table. The upper feed roller is freely rotatable and gravity biased toward the lower roller and the lower roller is driven by a motor with the number of revolutions per minute of the lower roller being controlled by a speed control device to thereby control the width of the strips being cut from the paper fed to the cutting area. Both the cutting element and roller feed assembly have a guard around the portions thereof above the feeding surface and cut paper strips fall from the cutter and are collected beneath the cutter, said strips being preferably about ¾ inch width when utilized for bedding for a dog pen.

4 Claims, 7 Drawing Figures

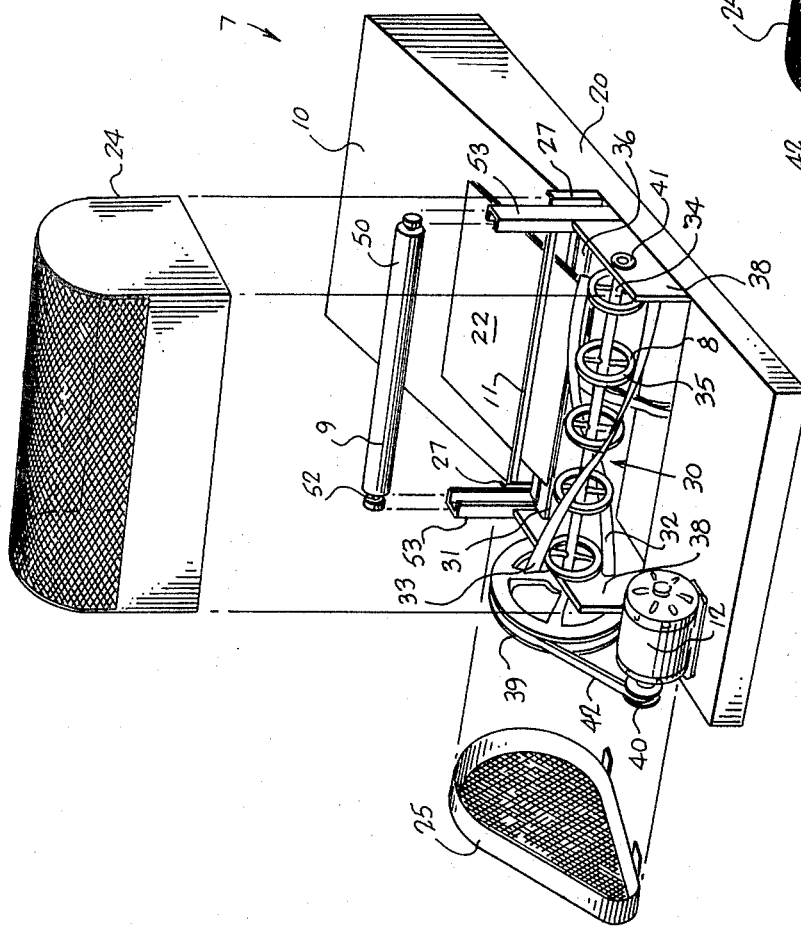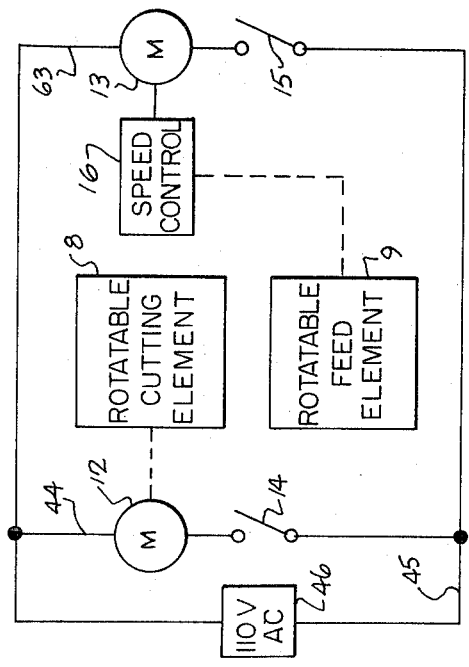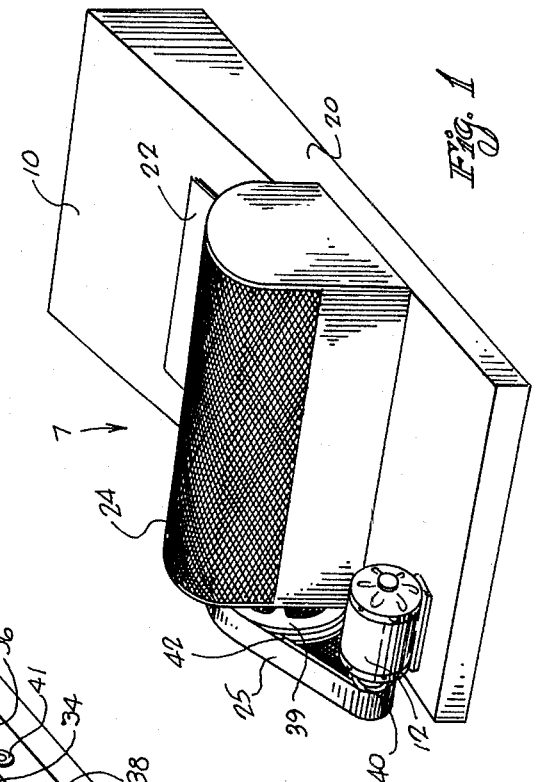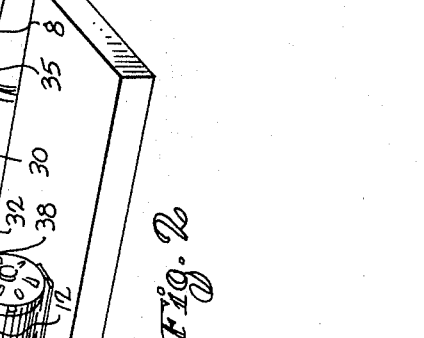

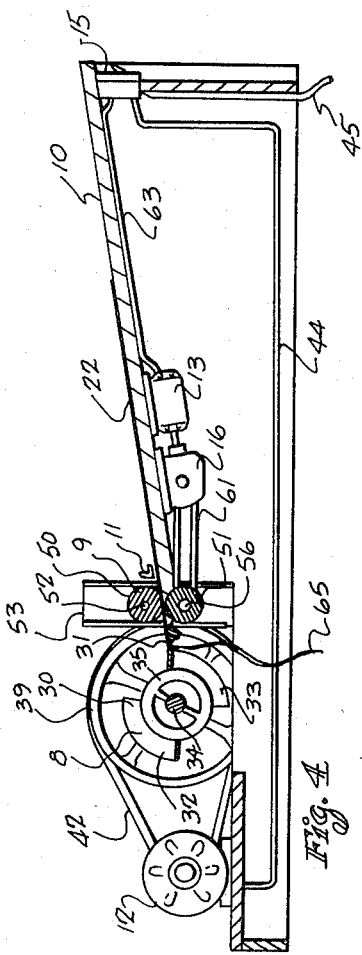
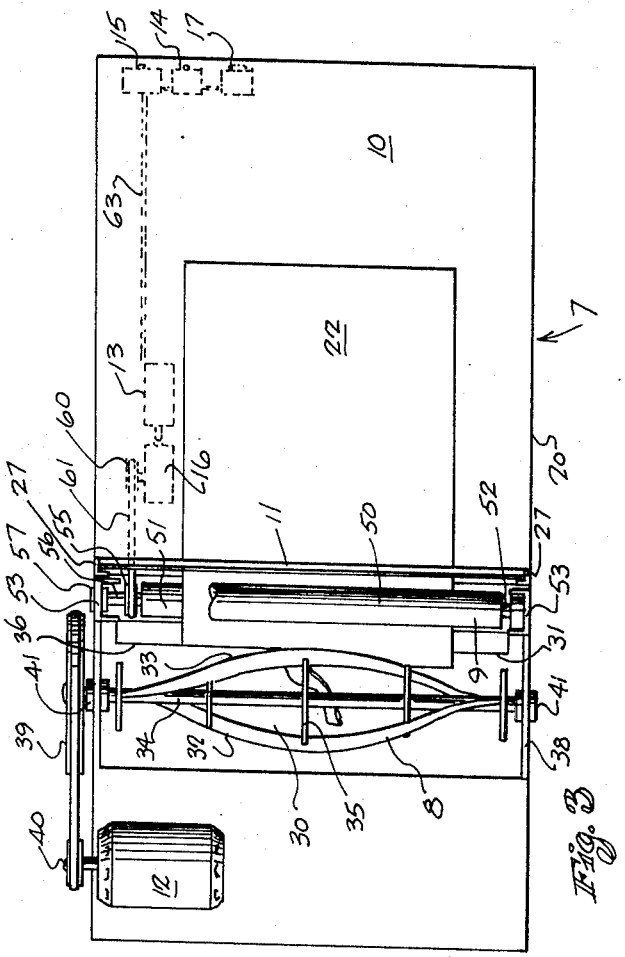
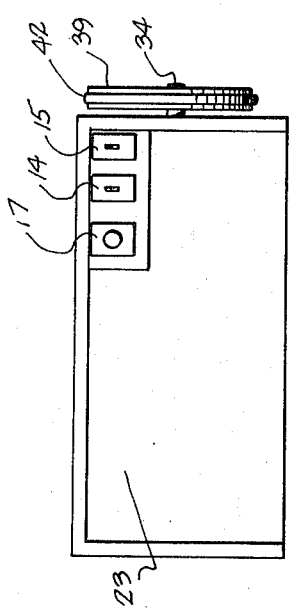
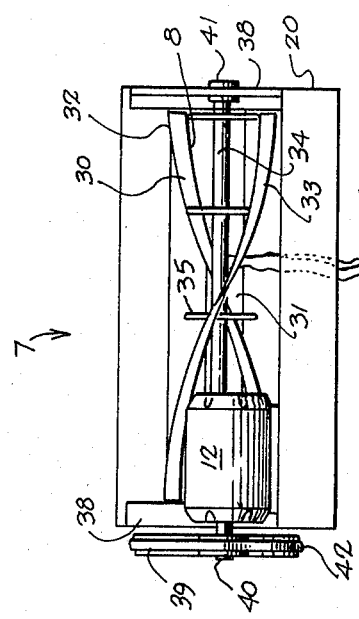

CUTTING DEVICE

FIELD OF THE INVENTION

This invention relates to a cutting device and, more particularly, relates to a cutting device for cutting paper in strips having widths suitable for bedding of animal pens.

DESCRIPTION OF THE PRIOR ART

Cutting devices have long been known, and the use of such devices to cut material such as, for example, paper are also well known. Likewise, the use of cutting devices utilizing a rotating knife cooperable with a fixed knife are also known, as are feed rollers utilized in conjunction with such cutting devices. For example, U.S. Pat. No. 3,515,618 teaches a chopper for applying small fibrous particles of rubber to a rotating green tire carcass and the chopper utilizes a reel type cutter for cutting rubber issuing from an extruder; U.S. Pat. No. 3,503,289 teaches a cutting device for cutting a continuous strip of rubber from a sheet and the device utilizes a rotating knife cooperable with a fixed knife as well as a feed conveyor with a hold roller thereabove to hold down the sheet as it is being advanced toward the rotating knife; U.S. Pat. No. 823,672 teaches a machine for making grains or flakes of powder and the machine utilizes a rotary cutter cooperable with a fixed knife; U.S. Pat. No. 667,408 is directed to a curd mill and the mill includes rotating knives that cut continuous strips of curd as well as teaching feed rollers in front of the rotating knives to feed curd to the knives; and U.S. Pat. No. 167,334 teaches a rotary cutter cooperable with a fixed knife in a straw cutting device with feed rolls also being utilized.

While various types of cutting devices have been heretofore known and/or utilized, none of these devices have proved to be completely successful in meeting at least some cutting needs, and more particularly, have not proved to be completely successful in providing a simple yet dependable and safe cutting device for cutting of material, such as paper, in quantities sufficient for purposes such as, for example, as bedding for animal pens, including dog pens.

SUMMARY OF THE INVENTION

This invention provides an improved material cutting device that is particularly well suited for cutting paper into strips for use as bedding in animal pens. The improved cutting device of this invention includes a cutting element positioned at a cutting area for cutting material into strips at the cutting area, a feed element for introducing material to be cut into the cutting area, means for driving the cutting means and the feed means, and control means connected with the driving means to control driving of the cutting and feed elements with the control means including rate varying means for varying the relative driving rate between the cutting and feed elements to thereby readily adjust the width of cut strips. In addition, the cutting device of this invention also provides maximum thickness acceptance means positioned adjacent to and above a feed table and under which material to be cut must pass prior to reaching the cutting area.

It is therefore an object of this invention to provide an improved cutting device.

It is another object of this invention to provide an improved cutting device suitable for cutting material into strips for use as bedding for animal pens.

It is another object of this invention to provide an improved cutting device having control means for readily adjusting the width of cut strips of material.

It is yet another object of this invention to provide an improved cutting device that includes maximum thickness acceptance means to establish the maximum thickness of material that can be cut by the cutting device.

It is another object of this invention to provide an improved cutting device that provides a relatively simple yet dependable and safe cutting device.

It is yet another object of this invention to provide an improved cutting device that is capable of cutting a large quantity of paper into strips within a relatively short period of time.

With these and other objects in view, which will become apparent to one skilled in the art as the description proceeds, this invention resides in the novel construction, combination, and arrangement of parts substantially as hereinafter described, and more particularly defined by the appended claims, it being understood that such changes in the precise embodiment of the herein disclosed invention are meant to be included as come within the scope of the claims.

BRIEF DESCRIPTION OF THE DRAWINGS

The accompanying drawings illustrate one complete embodiment of the invention according to the best mode so far devised for the practical application of the principles thereof, and in which:

FIG. 1 is a perspective view of the cutting device of this invention;

FIG. 2 is an exploded perspective view of the cutting device shown in FIG. 1;

FIG. 3 is a partially cut away top view of the cutting device shown in FIG. 1 with guards removed;

FIG. 4 is a side sectional view of the cutting device shown in FIG. 1;

FIG. 5 is a rear view of the cutting device shown in FIG. 1 again with guards removed;

FIG. 6 is a front view of the cutting device shown in FIG. 1; and

FIG. 7 is an electrical schematic, partially in block form, of the cutting device of this invention.

DESCRIPTION OF THE PREFERRED EMBODIMENT

Referring now to the drawings, the cutting device 7 of this invention includes a cutting element 8, a feed element 9, a feed table 10, a maximum thickness acceptance bar 11, a motor 12 for driving the cutting element, a motor 13 for driving the feed element, a switch 14 for controlling energization of motor 12, a switch 15 for controlling energization of motor 13, and speed control means 16 having a speed varying control knob 17 for controlling the speed of the feed element relative to the cutting element to thereby provide width adjustment for cut strips.

As shown best in FIGS. 1, 2 and 4, frame 20 of the cutting device supports feed table 10, which as shown has a downwardly slanting top surface across which paper 22 is advanced manually rearwardly toward the cutting element. As shown best in FIG. 6, switches 14 and 15 (controlling energization of motors 12 and 13)

as well as speed varying control knob 17 are preferably mounted at the front 23 of the frame for ease of operational control of the device.

As best shown in FIGS. 1 and 2, a guard 24 is provided covering the cutting element and feed element to provide maximum safety for the cutting device. In addition, a side guard 25 covers the drive between motor 12 and the cutting element 8.

As shown best in FIGS. 2, 3 and 4, maximum thickness acceptance bar 11 extends across the feed table near the cutting element and is parallel thereto. Bar 11 may be attached to frame 20 in any conventional manner such as by vertical arms 27 extending between the opposite edges of rod 11 and the opposite sides of frame 20. Rod 11 is preferably heightwise adjustable as desired to establish the maximum thickness of material that can be cut as is desired by the particular user (maximum thickness, or course, cannot exceed machine capability). Arm 11 is preferably mounted at the lower, or rearward, end of feed table 10, that is, the end nearest the cutting element so that material fed rearwardly along feed table 10 must pass between the bar and the feed table prior to being fed toward the cutting element.

Cutting element 8 includes a rotary portion 30 and a fixed portion 31. As shown in FIGS. 2, 3, and 5, rotary portion 30 includes a pair of spiral blades 32 and 33 mounted about a shaft 34 by means of mounting discs 35. As would be obvious to one skilled in the art, as the shaft 34 is rotated, the spiral blades are brought into contiguous relationship with a adjustably positionable fixed knife edge 36 of the fixed portion 31 of the cutting element to cut paper therebetween. Since the blades are spiral, the fixed and spiral blades cooperate to progressively cut the paper from one edge to the other, that is, as the spiral blade is rotated, different portions of the cutting edge come into contact with the fixed knife to thus perform a cut from one side of the paper to the other. Since two spiral blades are provided, cuts are alternately made by each blade. While two spiral blades have been shown and described herein, the number of blades could be varied as desired, and the invention is not meant to be limited to the specific number shown and described herein.

Shaft 34, upon which the spiral blades 32 and 33 are mounted, is mounted for rotation at opposite sides by a pair of side plates 38, side plates 38 being connected to frame 20 in any conventional manner with shaft 34 being mounted for rotation in the plates in conventional fashion such as through the use of bearings 41. Shaft 34 extends beyond one side plate 38 and has mounted thereon pulley wheel 39. Motor 12 has a pulley wheel 40 mounted on the motor shaft and a drive belt 42 extends between the pulley wheels. Shaft 34 is mounted for rotation with respect to the fixed knife edge 36 so that the path of travel of the spiral blades brings the blades into contiguous cutting position as the shaft is rotated. Motor 12 is preferably an electric motor and energization of the motor is controlled by switch 14. Lead 44 extends from the motor to switch 14, which switch is also connected through lead 45 to a conventional power supply such as 110–120 volt AC 60 Hz power supply 46 as indicated in the block diagram of FIG. 7.

Feed element 9 is positioned between the cutting area (that is, the area containing the cutting element and where cutting of the material into strips occurs) and the end of the feed table, the feed element being therefore adjacent to bar 11. Feed element 9 includes a pair of feed rolls, or rollers, 50 and 51. Upper feed roller 50 has the opposite ends of its central shaft 52 received in inwardly directed channels 53, which channels are positioned at opposite sides of and connected to frame 20. Upper feed roller 50 is freely rotatable and vertically displacable so as to freely receive different thicknesses of material between the two feed rollers. Feed roller 50 is therefore gravity biased toward lower feed roller 51. Lower feed roller 51 is mounted for rotation at opposite sides of frame 20 and has a pulley 55 mounted on its central shaft 56 near one side of frame 20 for driving the lower feed roller. Central shaft 56 is mounted at opposite sides of frame 20 in conventional fashion as by, for example, bearings 57. Rollers 50 and 51 are height-wise positioned so that paper or other material fed from the feed table under bar 11 is readily received between the feed rolls which then feed the paper to the cutting area. Feed rollers 50 and 51 are preferably made of rubber.

Lower roller 51 is driven by motor 13 through speed control means 16, which speed control means may be conventional and may, for example, be a variac control. Motor 13 is coupled to speed control 16 having an output shaft with pulley 60 mounted thereon, with pulley 55 on shaft 56 and pulley 60 having drive belt 61 extending therebetween. Motor 13 is energized through lead 63 connected to switch 15, with switch 15 also being connected to the 110 volt power supply through lead 45.

In operation, the cutting element is driven by energization of motor 12 which drives the rotatable portion of the cutting element at a constant predetermined speed. The lower feed roller is then rotated by motor 13 through speed control 16. Thus, by varying the control knob 17 of speed control 16, the number of revolutions per minute of the feed roller can be set at any desired speed within the range of the speed control device and preferably from near 0 revolutions per minute to a sufficiently high number of revolutions per minute to obtain cut widths of up to about 2 inches. At very slow speeds, the widths of cut strips 65 would, of course, be extremely small, for example, being ⅛ inch or less.

After energizing both of the motors by closing switches 14 and 15 and adjusting the initial speed of the feed roller by control knob 17 as desired, paper is then manually fed rearwardly across the feed table under the thickness bar and fed to the feed rollers which receive the paper and then meter the paper to the cutting element to cut the paper into strips. If it is found that the cut strips are not of the desired width, it is then necessary only to change the setting of the speed control knob to vary the width of the strips until the desired width is obtained. It has been found preferable to obtain cut widths of about ¾ inch where paper is to be cut and used as bedding for dog pens.

From the foregoing, it is to be realized that this invention provides an improved material cutting device that is particularly useful for cutting paper into strips of desirable widths for use for particular purposes such as, for example, as bedding for animal pens.

What is claimed is:
1. A cutting device, comprising:
   cutting means;

means for positioning said cutting means at a cutting area for cutting material into strips at said area whenever said cutting means is being driven;

feed means for introducing material to be cut into said cutting area whenever said feed means is being driven, said feed means including a bottom rotatable feed roll and a top feed roll positioned above and contiguous to said bottom feed roll, said top feed roll being gravity biased towards said bottom feed roll so that different thicknesses of material can be readily handled;

means for driving said cutting means and said bottom feed roll of said feed means;

control means connected to said driving means for controlling driving of said cutting means and said bottom feed roll of said feed means, said control means including rate varying means for varying the relative driving rate between said cutting means and said bottom feed roll of said feed means to thereby readily adjust the width of said strips;

a feed table positioned forwardly of said cutting area and slanting downwardly theretoward; and a bar extending across said feed table near said cutting area, said bar being positioned substantially parallel with the axis of said rotary cutting portion of said cutting element and said bar also being positioned above said feed table at a predetermined fixed distance therefrom so that paper to be cut must pass thereunder to thereby establish the maximum thickness of paper that can be cut by said cutting element.

2. A cutting device, comprising:

cutting means including a fixed blade and a pluraltiy of movable blades;

means for positioning said cutting means at a cutting area for cutting material into strips at said area whenever said cutting means is being driven;

first driving means for driving said movable blades of said cutting means;

first control means connected with said first driving means for causing said movable blades of said cutting means to be driven at a predetermined speed;

feed means including top and bottom relatively movable feed rolls between which material to be cut is fed and thereby introduced into said cutting area whenever said feed means is being driven;

second driving means for driving at least one of said feed rolls of said feed means;

second control means connected with said second driving means to cause said feed rolls to be driven at a predetermined speed, which speed can be varied as desired to readily adjust the width of cut strips;

a feed table positioned to feed material to said feed roll; and a bar extending across said feed table near said cutting area, said bar being positioned substantially parallel to the axis of said rotary cutting portion of said cutting element and said bar also being positioned above said feed table at a predetermined fixed distance therefrom so that paper to be cut must pass thereunder to thereby establish the maximum thickness of paper that can be cut by said cutting element.

3. A cutting device, comprising:

cutting means;

means for positioning said cutting means at a cutting area for cutting material into strips at said area whenever said cutting means is being driven;

feed means including feed rollers for introducing material to be cut into said cutting area whenever said feed means is being driven, said material to be cut passing between said feed rollers, and the distance between said feed rollers being automatically adjusted dependent upon the thickness of the material passed therebetween means for driving said cutting means and at least one feed roller of said feed means;

control means for controlling said driving means;

a feed table for supplying material to the feed rollers of said feed means; and a bar extending across said feed table near said cutting area, said bar being positioned substantially parallel with the axis of said rotary cutting portion of said cutting element and said bar also being positioned above said feed table at a predetermined fixed distance therefrom so that paper to be cut must pass thereunder to thereby establish the maximum thickness of paper that can be cut by said cutting element.

4. A cutting device for cutting paper into strips for use in animal bedding, said cutting device comprising:

a cutting element including a rotary cutting portion and a fixed cutting portion, said cutting element being positioned at a cutting area;

a first motor for rotating said rotary cutting portion of said cutting element;

a first motor control for controlling energization of said first motor, said first motor when energized causing said rotary cutting portion of said cutting element to be rotated at a predetermined fixed number of revolutions per minute;

a feed table positioned forwardly of said cutting area and slanting downwardly theretoward;

a bar extending across said feed table near said cutting area, said bar being positioned substantially parallel with the axis of said rotary cutting portion of said cutting element and said bar also being positioned above said feed table at a predetermined fixed distance therefrom so that paper to be cut must pass thereunder to thereby establish the maximum thickness of paper that can be cut by said cutting element;

a pair of vertically positioned feed rollers between said feed table and said cutting area for accepting paper from said feed table after said paper has passed under said bar and supplying the same to said cutting area, said upper feed roller being freely rotatable and gravity biased toward said lower feed roller;

a second motor for rotating said lower feed roller; and a second motor control for controlling energization of said second motor, said second motor control including speed varying means whereby said lower feed roller can be rotated at any number of revolutions per minute as desired within a predetermined range thereby providing control of cut strip widths.

* * * * *